(12) United States Patent
Chen

(10) Patent No.: US 10,417,014 B2
(45) Date of Patent: Sep. 17, 2019

(54) SYSTEM SERVICE RELOADING METHOD AND APPARATUS

(71) Applicant: WANGSU SCIENCE & TECHNOLOGY CO., LTD., Shanghai (CN)

(72) Inventor: Xun Chen, Shanghai (CN)

(73) Assignee: Wangsu Science & Technology Co., Ltd., Shanghai (CN)

( * ) Notice: Subject to any disclaimer, the term of this patent is extended or adjusted under 35 U.S.C. 154(b) by 87 days.

(21) Appl. No.: 15/568,733

(22) PCT Filed: Nov. 16, 2016

(86) PCT No.: PCT/CN2016/106053
§ 371 (c)(1),
(2) Date: Oct. 23, 2017

(87) PCT Pub. No.: WO2017/185718
PCT Pub. Date: Nov. 2, 2017

(65) Prior Publication Data
US 2018/0217852 A1    Aug. 2, 2018

(30) Foreign Application Priority Data

Apr. 28, 2016    (CN) .......................... 2016 1 0278178

(51) Int. Cl.
*G06F 9/445*    (2018.01)
*G06F 9/54*    (2006.01)
(Continued)

(52) U.S. Cl.
CPC .......... *G06F 9/44521* (2013.01); *G06F 9/547* (2013.01); *H04L 67/16* (2013.01);
(Continued)

(58) Field of Classification Search
CPC ..... G06F 9/44521; G06F 9/547; H04L 67/16; H04L 67/40
See application file for complete search history.

(56) References Cited

U.S. PATENT DOCUMENTS

2004/0221065 A1* 11/2004 Banerjee ................. H04L 29/06
709/250
2015/0143354 A1    5/2015 Mathew et al.

OTHER PUBLICATIONS

The European Patent Office (EPO) The Extended European Search Report for 16900225.0 (PCT/CN2016/106053) dated Nov. 15, 2018 9 Pages.

(Continued)

*Primary Examiner* — Umut Onat
(74) *Attorney, Agent, or Firm* — Anova Law Group, PLLC

(57) ABSTRACT

System service reloading method is provided. The method includes receiving a call request for calling a system service, the system service including at least two service processes having same configuration information recording at least port information and socket information; according to a pre-configured service reloading state, determining whether to perform a system service reloading, the service reloading state including at least an open state and a close state; when the service reloading state is the open state, obtaining a process attribute corresponding to the service processes, the process attribute recording a creation order of the service processes; and according to the process attribute, choosing one of the service processes in the system service to respond to the call request.

6 Claims, 3 Drawing Sheets

(51) Int. Cl.
*H04L 29/08* (2006.01)
*H04L 29/06* (2006.01)

(52) U.S. Cl.
CPC .............. *H04L 67/34* (2013.01); *H04L 67/40* (2013.01); *H04L 69/161* (2013.01)

(56) References Cited

OTHER PUBLICATIONS

Wiiiy I arreau [1/1] net: Add SO_REUSEPORT_LISTEN_OFF socket option as drain mode—Patchwork Dec. 15, 2015 XP055521300 Retrieved from the Internet, 8 pages.

* cited by examiner

SYSTEM SERVICE RELOADING METHOD AND APPARATUS

CROSS-REFERENCES TO RELATED APPLICATIONS

This application is a national stage patent application of PCT application No. PCT/CN2016/106053, filed on Nov. 16, 2016, which claims priority to Chinese Patent Application No. 201610278178.1, filed on Apr. 28, 2016, the entire content of all of which is incorporated herein by reference.

FIELD OF THE DISCLOSURE

The present disclosure generally relates to the field of the Internet and, more particularly, relates to a system service reloading method and apparatus.

BACKGROUND

In many types of operating systems, a variety of system services may be used in operation to achieve various functions. The service processes of some system services used to provide network services must be restarted to complete the configuration file reloading or the service process updating.

Taking the LINUX HAProxy network service as an example, this network service is implemented by using the SO_REUSEPORT option. After binding the newly created service process to the same network address (IP address) and network port as the original service process, it listens to the socket of the newly created service process. When a new service process is created, a notification signal is sent to the original service process to close the listening socket on the listening port. However, when both the newly created service process and the original service process bind to a same IP address and a same network port, and the listening socket of the original service process is not yet closed, the first packet (SYN packet) of a new connection request from an external client has an equal probability of being assigned to either the new service process or the original service process according to the implementation method of the existing LINUX kernel SO-REUSEPORT option. When the SYN packet is assigned to the original service process, and the listening socket of the original service process is immediately closed, based on the TCP protocol, the operating system will send a reset packet (TCP RST) to the external device to reset the connection.

Currently, some solutions exist for the problem described above. For example, a filtering rule (iptables rule) may be configured during the service process reloading to discard newly received SYN packets. According to the TCP protocol, after not receiving the SYN/ACK packets for a period of time, the client resends the SYN packet to reset the connection. By using the above solution, although the new connection will not be reset, it takes a long time, usually longer than about one second, for the client to wait for the connection timeout and to resend the SYN packet. While the service process reloading time is often only tens of milliseconds, the TCP connection delay is relatively long.

In another solution, LINUX traffic control tool (TC, traffic control) is used. Firstly, a filtering rule is used to mark the new SYN packet sent from the client. Then, the new SYN packet is temporarily cached by the TC. After the service process is reloaded, the SYN packet cached by the TC is released. Although the above solution has a relatively short delay, the applicable scenario may be limited because the TC tool can only be used to control the outflow of data traffic.

The above described problem of long delay in system service caused by reloading of the system service has not been solved effectively.

BRIEF SUMMARY OF THE DISCLOSURE

The disclosed embodiments of the present invention provide a method and an apparatus for the system service reloading so as to at least solve the technical problem of the prolonged system service time delay during the reloading period caused by the system service reloading.

One aspect of the disclosed embodiments of the present invention provides a system service reloading method including: receiving a call request for calling a system service, wherein the system service includes at least two service processes having same configuration information recording at least port information and socket information; according to a pre-configured service reloading state, determining whether to perform system service reloading, wherein the service reloading state includes at least an open state and a close state; when the service reloading state is the open state, obtaining a process attribute corresponding to the service processes, wherein the process attribute is used to record a creation order of the service processes; and according to the process attribute, choosing one of the service processes in the system service to respond to the call request.

Further, before receiving the call request for calling the system service, the method further includes: obtaining configuration information of a first service process in operation, wherein the configuration information includes at least information about a socket corresponding to the first service process; according to the configuration information, creating a second service process; and switching the service reloading state to the open state, and after choosing one of the service processes in the system service to respond to the call request according to the process attribute, the method further includes: switching the service reloading state to the close state; and terminating the service process that is not used to respond to the call request.

Further, when the process attribute is in a form of a character parameter and after the second service process is created according to the configuration information, the method further includes: configuring the character parameter in the configuration information corresponding to the second service process, wherein the character parameter is used to mark the socket of the newly created service process.

Further, choosing one of the service processes in the system service to respond to the call request according to the process attribute further includes: obtaining a calculated process value corresponding to each service processes; and determining one of the service processes to respond to the call request according to the calculated process value.

Further, performing a calculation process on the service processes in the system service according to the character parameter includes: performing a weighted calculation on the service processes in the system service according to the character parameter; and/or performing an accumulated calculation on the service processes in the system service according to the character parameter.

Further, when the service reloading state is the close state, the method further includes: performing a restoration and reset operation on the label of the socket of the second service process.

Further, when the process attributes are in a form of a time parameter recording a service process creation time, choosing one of the service processes in the system service to respond to the call request according to the process attributes includes: comparing the time parameters of all service processes with a system restart time; determining target service processes according to the comparison results, wherein the target service process is a service process that has a positive time difference between its time parameter and the system restart time; and randomly selecting a target service process among the target service processes as the service process to respond to the call request.

Another aspect of the disclosed embodiments of the present invention also provides a system service reloading apparatus, comprising: a receiving module configured to receive a call request calling for a system service, wherein the system service includes at least two service processes having the same configuration information; a processing module configured to determine whether to perform a system service reloading according to a pre-configured service reloading state, wherein the service reloading state includes at least an open state and a close state; a first acquisition module configured to obtain a process attribute corresponding to the service processes when the service reloading state is the open state, wherein the process attribute is used to record a creation order of the service process; and a choosing module configured to choose one of the service processes in the system service to respond to the call request according to the process attribute.

Further, the apparatus also includes: a second acquisition module configured to obtain configuration information of a first service process in operation, wherein the configuration information includes at least information about a socket corresponding to the first service process; a creation module configured to create a second service process according to the configuration information; a first configuration module configured to configure the service reloading state to the open state; a second configuration module configured to configure the service reloading state to the close state; and a termination module configured to terminate the service process that is not used to respond to the call request.

Further, when the process attribute is in a form of a character parameter, the apparatus also includes: a first marking module configured to configure a character parameter in the configuration information corresponding to the second service process, wherein the character parameter is used to mark the socket of the newly created service process.

Further, the determination module includes: a calculation unit configured to perform calculations on the service processes in the system service according to the character parameters to obtain a calculated process value corresponding to each service process; and a first determination unit configured to determine one of the service processes to respond to the call request according to the calculated process value.

Further, the calculation unit is configured to: perform weighted calculations on the service processes in the system service according to the character parameter; and/or perform accumulated calculations on the service processes in the system service according to the character parameter.

Further, when the service reloading state is the close state, the apparatus further includes: a marker restoration module configured to perform a restoration and reset process on the label of the socket of the second service process.

Further, when the process attribute is in a form of a time parameter recording a service process creation time, the choosing module includes: a comparing unit configured to compare the time parameters of all service processes with a system restart time; a second determining unit configured to determine target service processes according to the comparison results, wherein the target service process is a service process that has a positive time difference between its time parameter and the system restart time; and a selecting unit configured to randomly select a target service process among the target service processes as the service process to respond to the call request.

In various embodiments of the present invention, the method includes the following steps. A call request for calling a system service is received, where the system service includes at least two service processes having the same configuration information. According to a pre-configured service reloading state, whether to perform the system service reloading is determined. The service reloading state includes at least an open state and a close state. When the service reloading state is the open state, a process attribute corresponding to the service process is obtained, where the process attribute is used to record the creation order of the service process. According to the service attribute, the service process in the system service to respond to the call request is determined. Thus, the objective of selecting the service process is achieved, and the technical effect of the uninterrupted system service updating is realized. The present invention solves the technical problem of the prolonged system service time delay during the reloading period caused by the system service reloading.

BRIEF DESCRIPTION OF THE DRAWINGS

The drawings described herein are intended to facilitate further understanding of the present invention and form a part of the specification. The illustrative embodiments and descriptions thereof are intended to illustrate the present invention and are not to be construed as limiting the scope of the present invention. In the drawings.

DETAILED DESCRIPTION

In order to provide those skilled in the art with a better understanding of the present invention, the technical solutions according to the present invention are further described in detail with reference to the accompanying drawings of the exemplary embodiments. It should be understood that the exemplary embodiments described herein are only a part of the embodiments of the present invention, but not all embodiments of the present invention. Based on the described exemplary embodiments, other embodiments obtained by those of ordinary skill in the art without creative effort should be encompassed within the scope of the present invention.

It should be noted that the terms "first", "second" and the like in the specification and claims of the present invention and the above-described drawings are used to distinguish similar objects, and are not necessarily used to describe a specific order or precedence. It should be understood that the data thus used may be interchangeable as appropriate so that the embodiments of the present invention described herein can be implemented in an order other than those illustrated or described herein. In addition, the terms "comprise", "have" and their variations are intended to cover non-exclusive inclusion. For example, processes, methods, systems, products, or devices comprising a plurality of steps or units are not necessarily limited to those clearly listed steps or units, but may include other steps or units that are not explicitly listed or inherent to such processes, methods, products, or devices.

According to the disclosed embodiments, the present disclosure provides a system service reloading method. It should be noted that the steps shown in the flow chart of the drawings may be a set of computer executable instructions to be executed in a computer system. Further, although the flow chart shows the logic sequence, in some cases, the steps shown or described may be performed in a different order.

Figure 1:
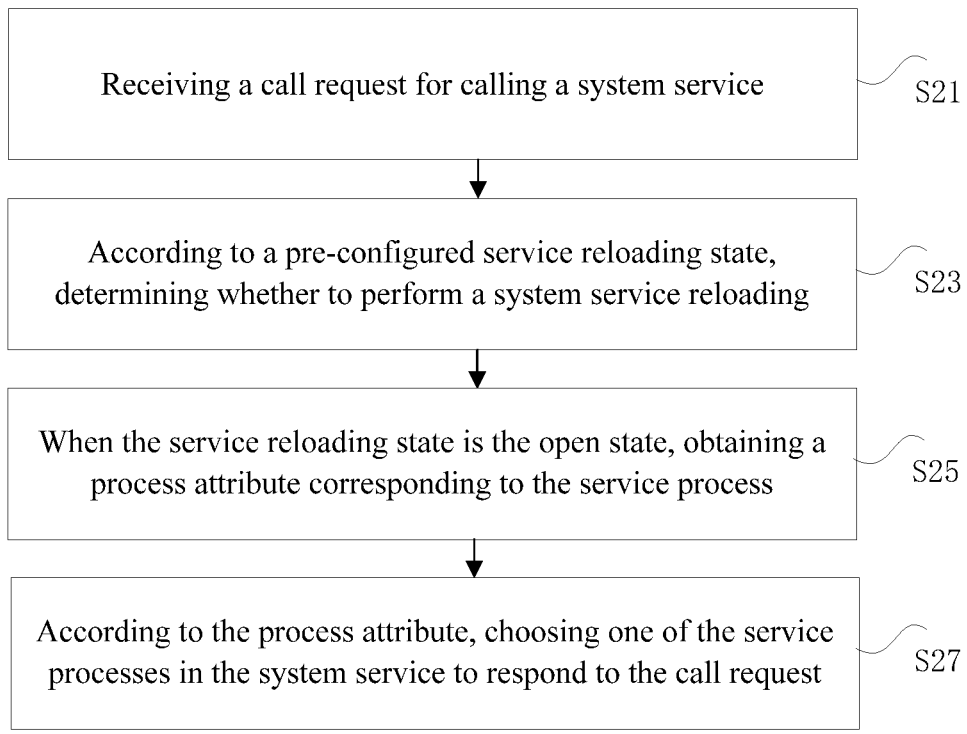
FIG. 1 illustrates a flow chart of an exemplary system service reloading method according to the disclosed embodiments of the present invention.

FIG. 1 illustrates a flow chart of an exemplary system service reloading method according to the present disclosure. As shown in FIG. 1, the method comprises the following steps.

Step S21: receiving a call request for calling a system service, wherein the system service includes at least two service processes having same configuration information recording at least port information and socket information.

Specifically, in the operating system, system services are often used to achieve a variety of specific functions. In the process of updating the system services, in order to reduce the impact on the functions achieved by the system services due to the updating, a service process having the same configuration information as the original service process may be created before terminating the original service process. The service process may run concurrently with the original service process. When the newly created service process is successfully created and started, the original service process can then be terminated.

Step S23: according to a pre-configured service reloading state, determining whether to perform a system service reloading, wherein the service reloading state includes at least an open state and a close state.

Specifically, before updating the system service, an updating label or a label of the service reloading state may be configured in advance. When the system service is called, the service reloading state may be obtained to determine whether the system service is being updated. The open state is used to indicate the system service is in the reloading state while the close state is used to indicate the system service is not in the reloading state.

Step S25: when the service reloading state is the open state, obtaining a process attribute corresponding to the service processes, wherein the process attribute is used to record a creation order of the service processes.

Specifically, when the service reloading state is the open state, it indicates that there may be at least two service processes with the same configuration information in the system service. In order to make the call request properly sent to the newly created service process, the process attribute recorded at the time of service process creation may be obtained before calling the system service. The process attribute may be used to determine the creation order of the service processes having the same configuration information to distinguish between the original service process and the newly created service process.

Step S27: according to the process attribute, choosing one of the service processes in the system service to respond to the call request.

Specifically, after the process attribute corresponding to the service process is used to determine the creation order of the service process, the call request is sent to the later created service process to avoid the occurrence of system service interruption caused by the original service process termination after the updating ends.

Through the steps from S21 to S27, when the newly created service process and the original service process share the same configuration information and run concurrently, the process attributes may be used to distinguish between the newly created service process and the original service process. All the call requests received at this time may be processed by the newly created service process, thus achieving the objective of selecting service processes and the technical effect of the uninterrupted system service updating. Thus, the technical problem of the elongated system service delay caused by the system service reloading can be solved.

For example, the network service in LINUX system is used to illustrate the present invention in practical applications. When the LINUX system kernel receives a new connection request for establishing a TCP connection to the system, the system may call _inet_lookup_listener( ) function to look up which listening socket the SYN packet is assigned to when the SYN packet is received from the client. Each listening socket corresponds to a specific service process. After the listening socket (i.e., the corresponding service process) is looked up and determined, the system kernel may use a weighted scoring method to select a system process matching the SYN packet according to the destination network port and IP address, etc., contained in the SYN packet. In the case that SO-REUSEPORT option is enabled, a plurality of sockets that bind to the same IP address and network port may exist in the system service. Because these sockets have identical optional parameters or configuration information, their calculated weighted scores may be the same as well. At this time, the system kernel may randomly select a service process corresponding to one of the listening sockets that have equal weighted scores.

Thus, the process attribute that records the creation order of the service process may be added to optional parameters of the listening sockets so that the system kernel may determine the listening socket corresponding to the latest started service process according to the process attributes when the system kernel needs to select from a plurality of listening sockets that have SO_REUSEPORT option enabled, and have identical IP address and network port.

Figure 2:
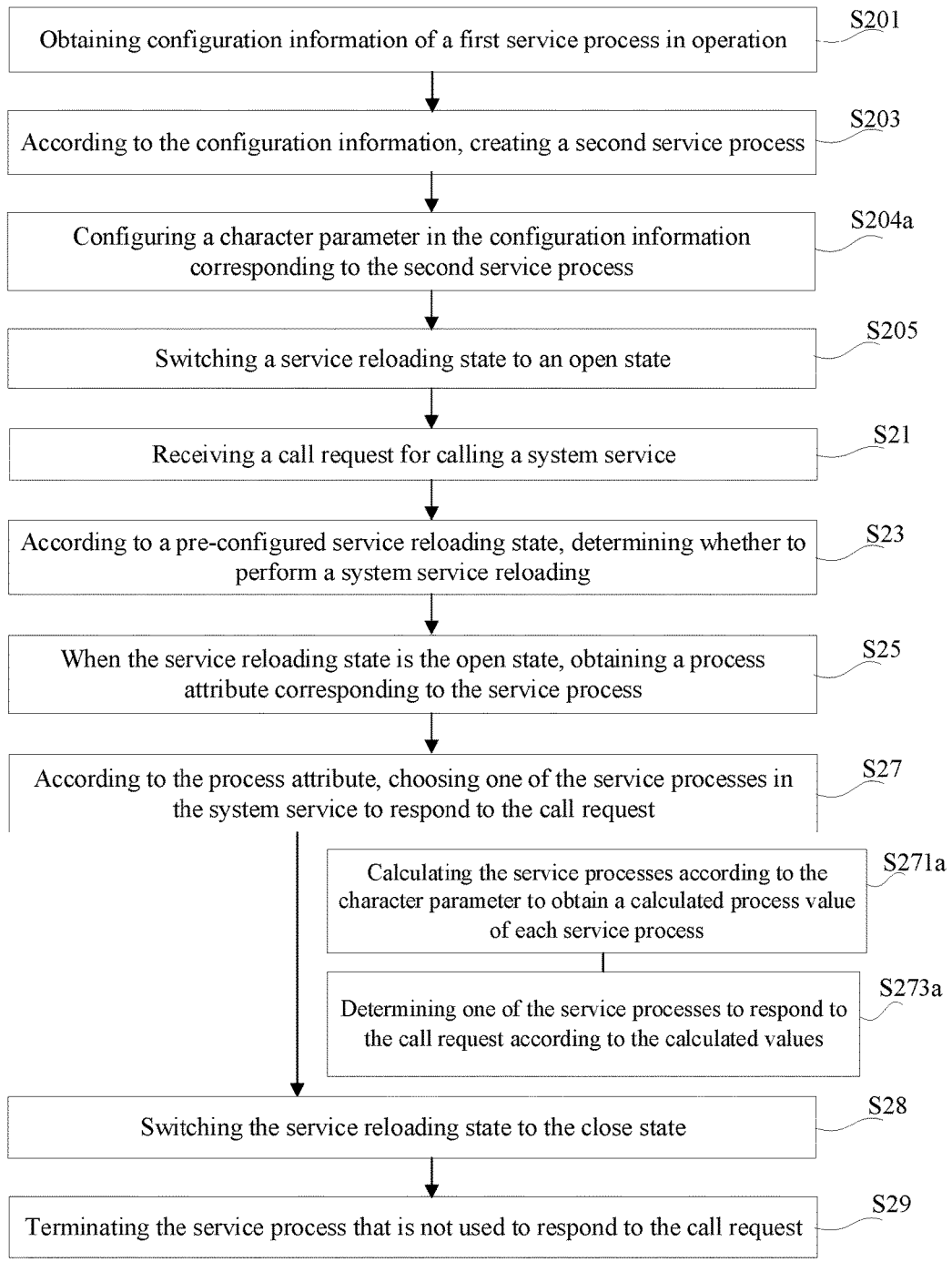
FIG. 2 illustrates a flow chart of another exemplary system service reloading method according to the disclosed embodiments of the present invention.

In one embodiment, as shown in FIG. 2, the method describe above may further include the following steps before a call request for calling the system service is received in the step S21.

Step S201: obtaining configuration information of a first service process in operation, wherein the configuration information includes at least information about a socket corresponding to the first service process.

Step S203: according to the configuration information, creating a second service process.

Step S205: switching the service reloading state to the open state.

Further, after the service process in the system service to respond to the call request according to the process attribute is determined in the step S27, the method described above may include the following steps.

Step S28: switching the service reloading state to the close state.

Step S29: terminating the service process that is not used to respond to the call request.

Specifically, before the service process is updated, the steps from S201 to S205 may be used to configure the newly created second service process according to the configuration information of the original first service process and to create the second service process that has the same listening socket as the first service process. After the second service process is created, the state is labeled in the operating system, and the service reloading state is set to the open state. Thus, the system may check the service reloading state to determine whether the system service is in the reloading state before calling the service process. Further, after the system service reloading is completed, the steps from S28 to S29 may be used to set the service reloading state to the close state, and to terminate the original service process in the system service.

In another embodiment, when the process attribute consists of a character parameter, after the second service process according to the configuration information is created in the step S203, the method describe above may also include the following step.

Step S204a: configuring the character parameter in the configuration information corresponding to the second service process, wherein the character parameter is used to mark the socket of the newly created service process.

Specifically, the step S204a is used to configure a member variable recording the creation order of service process in the configuration information. Alternatively, the member variable may be an integer, a character string, or, of course, a Boolean variable. The member variable is used to distinguish between the newly created service process and the original service process.

In another embodiment, when determining the service process in the system service to respond to the call request according to the process attribute in the step S27, the method describe above may also include the following steps.

Step S271a: calculating the service processes in the system service according to the character parameters to obtain a calculated process value corresponding to each service process.

Step S273a: determining one of the service processes to respond to the call request according to the calculated values.

Specifically, when the system calculates the weighted scores for the service processes, the steps from S271a to S273a may be used to include the values of the process attributes into the service process weighted score calculation so that the newly created service process may be determined from the service processes that have the same configuration information.

In another embodiment, the calculation process for the service processes in the system service according to the character parameter may include: performing a weighted calculation for the service processes in the system service according to the character parameter, and/or performing an accumulated calculation for the service processes in the system service according to the character parameter.

In another embodiment, when the service reloading state is in the close state, the method described above may also include: performing a restoration and reset operation on the label for the listening socket of the second service process. In this way, the label is restored and reset to avoid disruptions and crushes in the next restarting process.

In another embodiment, when the process attributes are in a form of a time parameter recording a service process creation time, choosing one of the service processes in the system service to respond to the call request according to the process attributes may include: comparing the time parameters of all service processes with a system restart time; determining target service processes according to the comparison results, wherein the target service process is a service process that has a positive time difference between its time parameter and the system restart time; randomly selecting a target service process among the target service processes as the service process to respond to the call request.

For example, the network service in LINUX system is used to illustrate the present invention in practical applications. When the SYN packet is received, the creation time of the service process may be determined by querying the configuration information related to the service process. At the same time, the current system time of the operating system is obtained. The current system time is compared with the creation time corresponding to each service process to determine the latest created service process, which is used to respond to the call request.

In another embodiment, in LINUX operating system, /proc file system is a virtual file system, through which the kernel space and user space of LINUX system may communicate with each other.

First, a kernel configuration option may be added to the /proc file system as a switch to control the connection assignment, e.g., /proc/sys/net/ipv4/reuseport_mark_new. When this option is set to 0 (default value), the execution behavior of the system kernel remains unchanged. When this option is set to 1, the kernel marks the listening socket of the newly created service process. At the same time, in the LINUX system kernel code, the struct sock structure is used to save the socket configuration information. A new member variable may be added to the struct sock structure to mark the socket of the newly created service process.

Then, before the network service reloading is executed, the kernel option reuseport_mark_new in the proc file system is set to 1 to notify LINUX system kernel to start marking the newly created socket. When a new client sends a new SYN packet for connection to LINUX system, the connection socket may be marked by the new member variable in the struct sock structure.

At this time, the network service reloading script is executed. When inet_lookup_listener ( ) function is used to calculate the weight of the service process corresponding to the socket, the marked socket of the newly created service process is assigned with additional weight so that the marked socket may be selected from a plurality of sockets having the same configuration information to process the SYN packet for a new network connection. On the other hand, the original service process socket is not marked, is not assigned with any additional weight, and may not be selected to process the new SYN packet. Thus, this ensures that the new SYN packet may only be processed by the newly created service process when the system service reloading is performed.

When the network service reloading is completed, reuseport_mark_new kernel option in the proc file system is set to 0 to restore the system kernel to the normal behavior.

Figure 3:
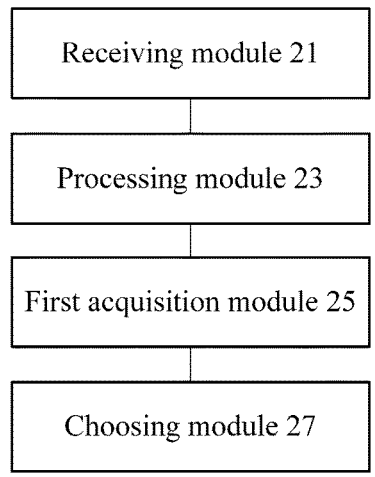
FIG. 3 illustrates a schematic diagram of an exemplary system service reloading apparatus according to the disclosed embodiments of the present invention.

Another aspect of the present invention provides a system service reloading apparatus. FIG. 3 illustrates a schematic diagram of an exemplary system service reloading apparatus according to the present disclosure.

As shown in FIG. 3, the apparatus may include: a receiving module 21, a processing module 23, a first acquisition module 25, and a choosing module 27.

The receiving module 21 is configured to receive a call request calling for a system service. The system service includes at least two service processes having the same configuration information. The configuration information records at least port information and socket information. The processing module 23 is configured to determine whether to perform a system service reloading according to a pre-configured service reloading state. The service reloading state includes at least an open state and a close state. The first acquisition module 25 is configured to obtain a process attribute corresponding to the service processes when the service reloading state is the open state. The process attribute is configured to record a creation order of the service processes. The choosing module 27 is configured to choose one of the service processes in the system service to respond to the call request according to the process attribute.

The receiving module 21, the processing module 23, the first acquisition module 25, and the choosing module 27 are used to distinguish between the newly created service process and the original service process according to the process attributes when the newly created service process and the original service process share the same configuration information and run concurrently. And all call requests received at this time may be processed by the newly created service process to achieve the objective of selecting the service processes and the technical effect of the uninterrupted system service updating. Thus, the technical problem of the elongated system service delay caused by the system service reloading is solved.

Figure 4:
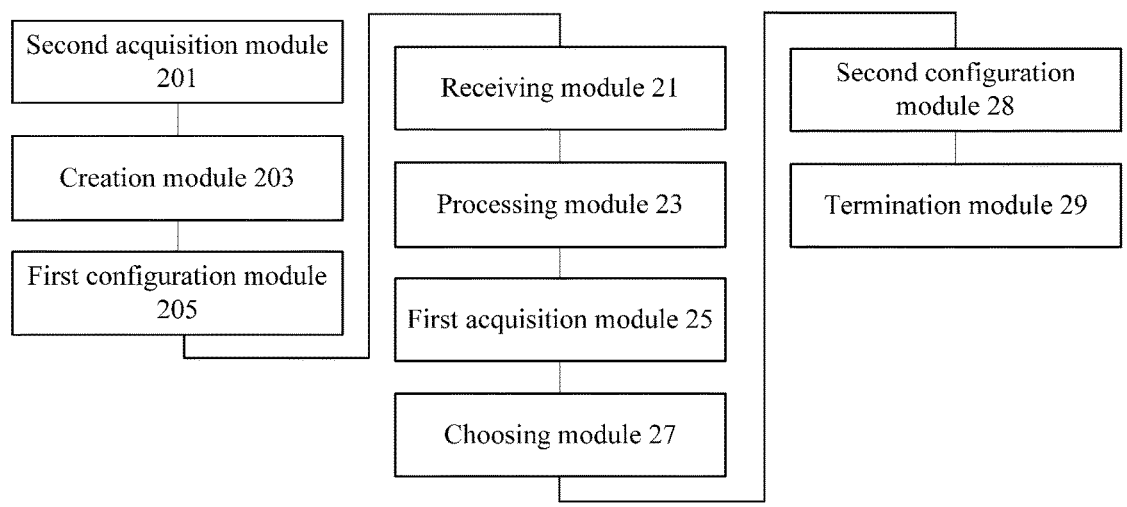
FIG. 4 illustrates a schematic diagram of another exemplary system service reloading apparatus according to the disclosed embodiments of the present invention.

In one embodiment, as shown in FIG. 4, the apparatus may also include a second acquisition module 201, a creation module 203, a first configuration module 205, a second configuration module 28, and a termination module 29.

The second acquisition module 201 is configured to obtain configuration information of a first service process in operation. The configuration information includes at least information about a socket corresponding to the first service process. The creation module 203 is configured to create a second service process according to the configuration information. The first configuration module 205 is configured to configure the service reloading state to the open state and the second configuration module 28 is configured to configure the service reloading state to the close state. The termination module 29 is configured to terminate the service process that is not used to respond to the call request.

Specifically, before the service process is updated, the second acquisition module 201, the creation module 203, and the first configuration module 205 may be used to configure a newly created second service process according to the configuration information of the original first service process to create the second service process that has the same listening socket as the first service process. After the second service process is created, the operating system may mark the listening socket and configure the service reloading state to the open state. So the system may check the service reloading state to determine whether the system service is in the reloading state before calling for the service process. After the system service is reloaded, the second configuration module 28 and the termination module 29 may be used to configure the service reloading state to the close state, and to terminate the original service process in the system service.

In another embodiment, when the process attribute is in a form of a character parameter, the apparatus described above may also include a first marking module.

The first marking module is configured to configure a character parameter in the configuration information corresponding to the second service process. The character parameter is used to mark the socket of the newly created service process.

Specifically, the first marking module may be used to configure a member variable in the configuration information, which records the creation order of the service process. Alternatively, the member variable may be an integer, a character string, or, of course, a Boolean variable. The member variable is used to distinguish between the newly created service process and the original service process.

In another embodiment, the choosing module may include a calculation unit, which is configured to perform calculations on the service processes in the system service according to the character parameters to obtain a calculated process value corresponding to each service process, and a first determination unit, which is configured to choose one of the service processes to respond to the call request according to the calculated process value.

In another embodiment, when the process attribute is in the form of character parameter, the apparatus described above may also include a first marking module, which is configured to configure the character parameter in the configuration information corresponding to the second service process. The character parameter is used to mark the socket of the newly created service process.

In another embodiment, the choosing module may include a calculation unit, which is configured to perform calculations on the service processes in the system service according to the character parameters to obtain a calculated process value corresponding to each service process, where the calculation processing may include weighted calculations and/or accumulated calculations; and a determination unit, which is configured to determine one of the service processes to respond to the call request according to the calculated process value.

In another embodiment, the apparatus described above may also include a third configuration module. When the process attribute is in a form of a time parameter, the third configuration module is used to configure a time parameter in the configuration information corresponding to the second service process after the second service process is created according to the configuration information. The time parameter is the creation time of the second service process. Further, the choosing module 27 may include an acquisition unit which is configured to obtain the current system time, and a query unit which is configured to locate the second service process according to the calculated time differences and to assign the second service process to respond to the call request.

The functional units and/or modules described in the embodiments of the apparatus are implemented in a manner similar to those described in the embodiments of the method, and will not be repeated herein.

The disclosed embodiments of the present invention are described for illustrative purposes only and are not to be construed as limiting the scope of the invention.

In the embodiments of the present invention described above, emphasis has been made to the description of each example. Certain aspect of the invention that is not described in detail in certain embodiment may be referred to the related description of the other embodiments.

It should be understood that the technical solutions disclosed in the embodiments of the present invention may be implemented in alternative manners. The embodiments of the apparatus described above are only for illustration purpose. For example, the units are partitioned based on the logical functions. In real life applications, other partition methods may be adopted. For example, a plurality of units or modules may be combined or integrated into another system. Certain features may be ignored or not implemented. Alternatively, the mutual coupling or direct coupling or communication connection illustrated or discussed above may be performed through certain interfaces, or implemented through indirect coupling or communication connection between the units or modules. The interconnection may be in the electrical form or other forms.

The elements described as separate components may or may not be physically separated. The units shown may or may not be physical units. That is, a unit may be located in one place or may be distributed over a plurality of units. Some or all of the elements may be selected according to the actual needs to achieve the objective of the present invention.

In addition, the functional units in the various embodiments of the present invention may be integrated into one processing unit or physically present as individual units. Alternatively, two or more units may be integrated into one unit. The integrated unit described above may be implemented in the form of hardware or software functional unit.

When the integrated unit is implemented in form of software functional unit and sold or used as standalone product, the integrated unit may be stored in a computer readable storage medium. Based on this understanding, the technical solution of the present invention, either in part or in whole, or the portion of the contribution in addition to the conventional solution, may be included in the software product. The computer software product may be stored in the storage medium, which includes a plurality of instructions to make a computer (e.g., a personal computer, a server, or a networking equipment, etc.) perform the entire or partial steps of the method described in various embodiments of the present invention. The storage medium describe above may include a USB disk, a read-only memory (ROM), a random access memory (RAM), a portable hard drive, a magnetic disk, an optical disk, or any suitable storage medium suitable for storing program instructions.

Various preferred embodiments of the present invention are described above. It should be noted that modifications and improvements may be made by those skilled in the art without departing from the principles of the present invention. Such modifications and improvements are considered as encompassed in the scope of the present invention.

What is claimed is:

1. A system service reloading method, comprising:
receiving a call request for calling a system service, wherein the system service includes at least two service processes having same configuration information recording at least port information and socket information;
according to a pre-configured service reloading state, determining whether to perform system service reloading, wherein the service reloading state includes at least an open state and a close state;
when the service reloading state is the open state, obtaining a process attribute corresponding to the service processes, wherein the process attribute is used to record a creation order of the service processes and the process attribute is in a form of a time parameter recording a service process creation time; and
according to the process attribute, choosing one of the service processes in the system service to respond to the call request, wherein choosing the one of the service processes includes:
comparing time parameters of all service processes with a system restart time;
determining target service processes according to the comparison, wherein the determined target service processes have positive time differences between their time parameters and the system restart time; and
randomly selecting a target service process among the determined target service processes as the service process to respond to the call request.

2. The method of claim 1, wherein:
before receiving the call request for calling the system service, the method further includes:
obtaining configuration information of a first service process in operation, wherein the configuration information includes at least information about a socket corresponding to the first service process;
according to the configuration information, creating a second service process; and
switching the service reloading state to the open state, and
after determining one of the service processes in the system service to respond to the call request according to the process attribute, the method further includes:
switching the service reloading state to the close state; and
terminating the service process that is not used to respond to the call request.

3. The method of claim 2, wherein:
the process attribute is in a form of a character parameter, and
after the second service process is created according to the configuration information, the method further includes:
configuring the character parameter in the configuration information corresponding to the second service process, wherein the character parameter is used to mark the socket of the newly created service process.

4. The method of claim 3, wherein determining one of the service processes in the system service to respond to the call request according to the process attribute further includes:
calculating the service processes in the system service according to the character parameter to obtain a calculated process value corresponding to each service process; and
choosing one of the service processes to respond to the call request according to the calculated process value.

5. The method of claim 4, wherein calculating the service processes in the system service according to the character parameter includes:
performing a weighted calculation on the service processes in the system service according to the character parameter; and/or
performing an accumulated calculation on the service processes in the system service according to the character parameter.

6. The method of claim 3, wherein, when the service reloading state is the close state, the method further includes:
performing a restoration and reset operation on a label of the socket of the second service process.

* * * * *